United States Patent [19]

Waddell et al.

[11] Patent Number: 5,426,136

[45] Date of Patent: Jun. 20, 1995

[54] PARTICULATE AMORPHOUS SILICA ASSOCIATED WITH THIN POLYMERIC FILM

[75] Inventors: Walter H. Waddell, Pittsburgh; Larry R. Evans, Jeannette, both of Pa.; Jeffrey H. Harwell; John H. O'Haver, both of Norman, Okla.

[73] Assignee: PPG Industries, Inc., Pittsburgh, Pa.

[21] Appl. No.: 37,985

[22] Filed: Mar. 24, 1993

[51] Int. Cl.$^6$ .............................. C08K 9/04
[52] U.S. Cl. .................... 523/200; 524/761; 523/205; 523/209; 428/407
[58] Field of Search ............ 524/761; 523/200, 205, 523/209; 428/407

[56] References Cited

U.S. PATENT DOCUMENTS

| | | | |
|---|---|---|---|
| Re. 34,145 | 12/1992 | Martin | 523/205 |
| 4,770,906 | 9/1988 | Harwell et al. | 427/212 |
| 4,900,627 | 2/1990 | Harwell et al. | 428/403 |
| 5,028,482 | 7/1991 | Jeffs | 428/323 |
| 5,032,425 | 7/1991 | Livsey et al. | 427/57 |
| 5,106,691 | 4/1992 | Harwell et al. | 428/411.1 |

OTHER PUBLICATIONS

Wu, J. et al, "Two-Dimensional Solvents: Kinetics of Styrene Polymerization in Admicelles at or near Saturation", formerly Physical Chemistry, 91 (1987), pp. 623-634.

Wu, J. et al, "Application of Thin Films to Porous Mineral Oxides Using Two-Dimensional Solvents", AICHE Journal, Sep. 1988, vol. 34, No. 9, pp. 1511-1518.

Harwell, J. H. et al, "Pseudophase Separation Model for Surfactant Adsorption: Isomerically Pure Surfactants", Langmuir, 1 (1985), pp. 251-262.

Bitting, D. et al, "Effects of Counterions on Surfactant Surface Aggregates at the Alumina/Aqueous Solution Interface", Langmuir, 3 (1987), pp. 500-511.

Wu, J. et al, "Two-Dimensional Reaction Solvents: Surfactant Bilayers in the Formation of Ultrathin Films", Langmuir, 3 (1987), pp. 531-537.

Primary Examiner—Paul R. Michl
Assistant Examiner—John J. Guarriello
Attorney, Agent, or Firm—George D. Morris

[57] ABSTRACT

Particulate amorphous silica, surfactant, monomer, and an aqueous solvent are brought into mutual contact so that as equilibrium is approached the concentration of the surfactant in the liquid phase is below, at, or slightly above the critical micelle concentration; the monomer is then polymerized to form polymeric film associated with at least a portion of the surface of the particulate amorphous silica, the polymeric film being (i) homopolymer of an aliphatic monomer or (ii) copolymer of at least two different monomers.

40 Claims, No Drawings

PARTICULATE AMORPHOUS SILICA ASSOCIATED WITH THIN POLYMERIC FILM

Particulate amorphous silica has been used as a reinforcing pigment in rubber compositions. The effectiveness of particulate amorphous silica as a reinforcing pigment is enhanced when the silica particles are treated with at least one coupling agent such as a silane, silanol, siloxane, lactone, triazine, or epoxide. Although it is not desired to be bound by any theory, it is believed that the surface of amorphous silica is generally polar under most conditions whereas the rubber surface is, on balance, relatively nonpolar in nature. As a consequence, the mutual affinities of the amorphous silica and the rubber are low. It is also believed that coupling agents enhance the reinforcing properties of the amorphous silica particles in rubber because they promote the mutual affinities of the amorphous silica particles and the rubber either by direct chemical bonds or by causing the polarities of the pigment particles and the rubber to become more nearly the same. In most cases the coupling agents used commercially are expensive and sometimes they are rather exotic compounds. The search for coupling agents which are effective, less expensive, and less exotic therefore continues.

U.S. Pat. Nos. 4,770,906; 4,900,627; and 5,106,691 describe the production of thin films of organic polymer on particulate alumina substrates. These patents describe contacting the particulate alumina substrates with a surfactant solution so that an interface is formed between the substrate surface and the surfactant solution under conditions which promote the assembly at such interface of surfactant in the form of a bilayer of surfactant molecules. Monomer is contacted with the surfactant bilayer under conditions permitting monomer molecules to become concentrated within the surfactant bilayer. The monomer molecules within the bilayer are then polymerized to form the thin organic polymer film. In these circumstances the surfactant bilayer may be regarded as a surfactant template for formation of the thin film.

The present invention, which is an improvement to the three patents discussed above, permits particulate amorphous silica to be associated with thin polymeric films which improve the effectiveness of particulate amorphous silica as reinforcing pigment in rubber. In many, but not all, instances the polymeric films are rubber films the composition of which at least fairly closely resembles the rubber in which the surface-modified particles are incorporated.

It was by no means assured that the principles of the three patents described above could be successfully applied to particulate amorphous silica for rubber reinforcement since surfactants can interfere with the green tack and curing of rubber compositions. (Green tack is necessary in order to build tires and other rubber articles.) Moreover, application of the principles of the three patents to the formation of thin polymeric films on particulate amorphous silica substrates has not been straightforward. Rather, substantial changes in procedure, and in some cases changes in surfactants and monomers, were necessary to obtain successful results.

One property illustrating the considerable differences between particulate alumina and particulate amorphous silica is the point of zero charge (PZC; this is the pH at which the oxide exhibits a net surface charge of zero) which is about pH 9 for particulate alumina and about pH 2 to 3 for particulate amorphous silica. Since coating technology of the type discussed herein is heavily dependent upon surface effects, these differences in PZC are very important to the procedures used and to the results obtained.

Micelles of surfactant in aqueous media are well known. They are characterized as aggregates of surfactant molecules such that the nonpolar parts of the surfactant molecules are together on the inside and the polar parts are on the outside. Micelles form at surfactant concentrations at or above the critical micelle concentration (CMC). The CMC may be determined using a conductivity versus concentration plot. Conductivity of the solution may be measured using an RC-20 Solu-Bridge Conductivity Meter (Beckman Instruments Inc., Cedar Grove, N.J.) or other suitable apparatus known to the art.

When physically adsorbed on solid surfaces at a polar solid-polar liquid interface, surfactant molecules form micelle-like bilayered surfactant aggregates, called admicelles. In the first surfactant layer of an admicelle, polar portions of the surfactant molecules are adsorbed onto the polar solid surface while the nonpolar portions are oriented away from the solid surface. In the second surfactant layer of the admicelle, nonpolar portions of the surfactant molecules are are oriented toward the nonpolar portions of the surfactant molecules of the first layer and the polar portions are oriented toward the polar liquid phase. Just as micelles can incorporate other molecules into their structure in the phenomenon termed solubilization, so admicelles exhibit an analogous behavior which is referred to as adsolubilization. If the surfactant is amphipathic, that is, the surfactant molecule has both a polar end and a nonpolar end and is big enough for each end to display its own solubility behavior, the surfactant may be regarded as having a polar head and a nonpolar tail. An admicelle of such surfactant may be considered as composed of two layers of the surfactant molecules where the tails of one layer are oriented tail-to-tail with the tails of the other layer and where the heads of one layer are adsorbed onto the solid polar surface. The heads of the other layer are oriented toward the polar liquid phase.

The method of the invention is characterized by: (a) admicelle formation, (b) monomer adsolubilization, and (c) polymerization of adsolubilized monomer. These may be accomplished sequentially in separate, discrete steps, but preferably admicelle formation and monomer adsolubilization are accomplished substantially simultaneously.

Accordingly, an embodiment of the invention is a process for producing surface-modified particulate amorphous silica, said process comprising: (a) bringing into mutual contact particulate amorphous silica, surfactant, monomer, and an aqueous solvent so that as equilibrium is approached the concentration of the surfactant in the liquid phase is below, at, or slightly above the critical micelle concentration; and (b) polymerizing the monomer to form polymeric film associated with a portion of the surface of the particulate amorphous silica, the polymeric film being (i) homopolymer of an aliphatic monomer or (ii) copolymer of at least two different monomers, wherein the surface-modified particulate amorphous silica so produced has a carbon content in the range of from 0.1 to 20 weight percent.

In a method for producing surface-modified particles wherein: (a) particulate substrate surface is contacted with surfactant solution comprising surfactant molecules dissolved in an aqueous solvent to form at least one admicelle on the substrate surface; (b) the admicelle is contacted with monomer solution comprising monomer molecules dissolved in an aqueous solvent to concentrate at least a portion of the monomer molecules within the admicelle; and (c) the concentrated monomer molecules are polymerized to produce polymeric film dimensionally determined by the admicelle and associated with a portion of the particulate substrate surface; another embodiment is the improvement wherein the particulate substrate is particulate amorphous silica and the polymeric film is (i) homopolymer of an aliphatic monomer or (ii) copolymer of at least two different monomers, and the carbon content of the surface-modified particles is in the range of from 0.1 to 20 weight percent.

Yet another embodiment of the invention is surface-modified particles comprising particulate amorphous silica having a portion of the surface thereof associated with polymeric film of (i) homopolymer of an aliphatic monomer or (ii) copolymer of at least two different monomers, and having a carbon content in the range of from 0.1 to 20 weight percent.

In a rubber composition which comprises rubber and surface-modified particles, another embodiment of the invention is the improvement wherein the surface-modified particles are particulate amorphous silica having a portion of the surface thereof associated with polymeric film of (i) homopolymer of an aliphatic monomer or (ii) copolymer of at least two different monomers, and having a carbon content in the range of from 0.1 to 20 weight percent.

There are many different kinds of particulate amorphous silicas which may be used in the present invention. The most common are particulate fumed amorphous silica, particulate amorphous silica gel, and particulate amorphous precipitated silica.

Particulate fumed amorphous silica is produced by condensing silica from the vapor phase at elevated temperature. The silica vapor is produced by (a) direct volatilization of $SiO_2$, (b) reduction of $SiO_2$ to volatile SiO which is reoxidized, (c) oxidation of volatile silicon compounds such as chloride or esters, or (d) vapor phase hydrolysis of $SiF_4$.

Many different particulate amorphous precipitated silicas are known and have been used in a wide variety of applications. Particulate amorphous precipitated silicas are most commonly produced by precipitation from an aqueous solution of sodium silicate using a suitable acid such as sulfuric acid, hydrochloric acid, and/or carbon dioxide. Processes for producing amorphous precipitated silicas and the properties of the products are described in detail in U.S. Pat. Nos. 2,657,149; 2,940,830; 4,495,167, 4,681,750, and 5,094,829.

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica that have not at any point existed as macroscopic gel during the preparation. The sizes of the aggregates and the degree of hydration may vary widely.

Particulate amorphous precipitated silica differs from silica gels that have been pulverized in ordinarily having a more open structure, that is, a higher specific pore volume. However, the specific surface area of amorphous precipitated silica as measured by the Brunauer, Emmett, Teller (BET) method using nitrogen as the adsorbate, is often lower than that of silica gel.

In many instances size reduction of amorphous precipitated silica is desired. This has been accomplished by many techniques including milling, crushing, cracking, and size reduction in a fluid energy mill.

Admicelles may be induced to form above, at, or below the CMC. Irrespective of the surfactant concentration relative to the CMC when they are formed, it is preferred that at equilibrium the surfactant concentration be below the CMC. There are two main advantages for this, both based upon the lack of micelles in the liquid. First, the substantial absence of micelles in the liquid tends to concentrate monomer in the admicelles. Second, the substantial absence of micelles in the liquid encourages a low concentration of monomer in the liquid and hence discourages monomer polymerization in the liquid. Again, although it is not desired to be bound by any theory, it is believed that admicelles can exist and be formed below the CMC because the solid surface provides an environment more favorable to admicelle formation than the liquid provides for micelle formation.

Admicelle formation on polar solid surfaces may be induced at surfactant concentrations below the CMC by manipulation of the identity of the surfactant, solution pH, and counterion concentration. To obtain admicelle formation, the most critical parameters to be manipulated are the solution pH and the identity and type of surfactant employed. As the pH of the surfactant solution is progressively lowered below the PZC, the polar solid surface becomes progressively more protonated and more positively charged. Conversely, as the pH of the surfactant solution is progressively increased above the PZC, the solid surface becomes progressively more negatively charged. Anionic surfactants are therefore more readily adsorbed by polar solid surfaces to form admicelles at values of surfactant solution pH below the PZC while cationic surfactants are more readily adsorbed to form admicelles at values of surfactant solution pH above the PZC. The PZC does not represent a sharp discontinuity, however, for admicelles of anionic surfactants can be formed at and somewhat above the PZC and admicelles of cationic surfactants can be formed at and somewhat below the PZC. Nonionic surfactants are adsorbed by polar solid surfaces to form admicelles at, above, and below the PZC.

The PZC of particulate amorphous silica is about pH 2 to 3. Anionic surfactants can at least theoretically be used to form admicelles at values of surfactant solution pH below these already low values of PZC. Nevertheless, since very low values of solution pH can sometimes degrade the particulate amorphous silica, and since there is ordinarily no advantage to offset the cost of operating at very low pH values, anionic surfactants are rarely employed. Cationic surfactants and nonionic surfactants are therefore the surfactants of choice. In view of the low PZC, cationic surfactants are preferred. This situation is to be contrasted with that in respect of particulate alumina where the PZC is high, about pH 9, and where the surfactants of choice are anionic.

The solvent of the surfactant solution is aqueous. Water may be used alone but in many instances a mixture of water and at least one organic polar cosolvent is used. Examples of polar compounds that can be used as cosolvents include methanol, ethanol, n-propanol, isopropanol, n-butanol, isobutanol, sec-butanol, tert-butanol, n-pentanol, ethylene glyclol, 2-methoxyethanol, 2-ethoxyethanol, acetone, methyl ethyl ketone, methyl acetate, ethyl acetate, and acetonitrile. A single organic polar cosolvent or a mixture of organic polar cosolvents may be used. The preferred solvent of the surfactant solution is a mixture of water and ethanol.

The surfactants which can be used to form admicelles are numerous and widely varied. Lists of exemplary surfactants are given in Kirk-Othmer, Encyclopedia of Chemical Technology, Third Edition, Volume 22, John Wiley & Sons, New York (1983), pages 347-386. Examples of cationic surfactants that can be used include N-cocotrimethylenediamine, N-tallowtrimethylenediamine, cetyldimethylamine oxide, cocodimethylamine oxide, laurylbis(2-hydroxyethyl)amine oxide, cocobis[(polyethoxy)ethanol], stearylbis[(polyethoxy)ethanol], and especially quaternary ammonium salts such as cetyltrimethylammonium bromide, cetyltrimethylammonium chloride, tallowtrimethylammonium chloride, myristyltrimethylammonium bromide, N-laurylpyridinium chloride, dicocodimethylammonium chloride, distearyldimethylammonium chloride, di(hydrogenated tallow)dimethylammonium chloride, and stearylbenzyldimethylammonium chloride. Examples of nonionic surfactants include alcohol ethoxylates such as laurylethoxylate (3 EO), laurylethoxylate (7 EO), laurylethoxylate (23 EO), cetylethoxylate (10 EO), cetylethoxylate (20 EO), stearylethoxylate (10 EO), stearylethoxylate (20 EO), oleylethoxylate (20 EO), and tallowethoxylate (30 EO); alkylphenol ethoxylates such as octylphenylethoxylate (5 EO), octylphenylethoxylate (10 EO), octylphenylethoxylate (30 EO), nonylphenylethoxylate (8 EO), nonylphenylethoxylate (10 EO), nonylphenylethoxylate (15 EO), nonylphenylethoxylate (20 EO), nonylphenylethoxylate (30 EO), and dodecylphenylethoxylate (10 EO); poly(oxyethylene-co-oxypropylene)s such as those in which poly(propylene oxide) is ethoxylated and those in which poly(ethylene oxide) is propoxylated; poly(ethylene glycol) esters of fatty acids; poly(oxyethylene) esters of rosin, tall oil, or fatty acid; and sorbitan esters of tall oil or fatty acid. Examples of anionic surfactants include alkyl sulfates such as sodium dodecyl sulfate; ethyoxylated alcohol sulfates such as the sodium sulfate salt of laurylethoxylate (3 EO); and ethoxylated alkylphenol sulfates such as the sodium sulfate salt of nonylphenolethoxylate (4 EO). The foregoing is for purposes of example only, and is not intended to be an exhaustive listing of surfactants, of which hundreds are known. Mixtures of surfactants, whether of the same ionic class (viz., anionic, nonionic, or cationic) or of different ionic classes, may be used when desired.

The amount of surfactant in the solution can be widely varied. In most cases the the surfactant constitutes from 0.01 to 10 weight percent of the solution. Often the surfactant constitutes from 0.05 to 2 weight percent of the solution. From 0.1 to 1 weight percent is preferred.

The pH of the surfactant solution during admicelle formation is usually in the range of from 1 to 8. In many instances the pH is in the range of from 3 to 8. When cationic surfactant is employed it is preferred that the pH of the surfactant solution be in the range of 4 to 8. When nonionic surfactant is used, it is preferred that the pH of the surfactant solution be in the range of from 3 to 5. When anionic surfactant is used, the pH of the surfactant solution is ordinarily in the range of 1 to 3. These ranges are not critical, but are for general guidance. When mixtures of surfactants from different ionic classes are employed, satisfactory values of pH may be ascertained empirically by simple, routine laboratory scale experiments.

The temperature during admicelle formation may be any temperature where a liquid solution can be maintained. In most instances the temperature is in the range of from $-10°$ C. to $+70°$ C. Preferably the temperature is in the range of from $0°$ C. to $40°$ C. The pressure during admicelle formation may be subatmospheric, ambient atmospheric, or superatmospheric, as desired.

As will be more fully developed below, the process for forming admicelles is conducted such that as equilibrium is approached, the concentration of the surfactant in the liquid phase is preferably below the critical micelle concentration. At such concentrations the admicelle formation over the particulate amorphous silica surface will be patchwise. Admicelle formation which substantially completely covers and is substantially coextensive with the particulate amorphous silica surface can be accomplished. In order to achieve this, however, the concentration of the surfactant in the surfactant solution must ordinarily be above or at the CMC or, if below the CMC, very near to it. Since it is advantageous to minimize or even eliminate the presence of micelles in the liquid phase during the polymerization of monomer, and since there is little or no advantage in having the amorphous silica particles substantially completely covered with polymer film, patchwise formation of admicelles is preferred. The patches should be numerous or extensive enough so that when the surface-modified particulate amorphous silica is employed as reinforcing pigment in rubber, the thin polymer film will, on average, be able to couple the amorphous silica particle to the rubber matrix at more than one location.

The assembly of surfactant molecules may be promoted or discouraged by altering the surface charge density of the particulate amorphous silica surface. The surface charge density may be altered by altering the pH of the surfactant solution and/or by introducing to the solution one or more other potential-determining ions and counterions, such as electrolytes.

Reasonable quantitative estimates of the "patchiness" of admicelle coverage may be ascertained from a plot of the logarithm of surfactant adsorption as a function of equilibrium surfactant concentration in the liquid phase or from a plot of surfactant adsorption as a function of the logarithm of the equilibrium surfactant concentration after the manner of Daryl Bitting and Jeffrey Harwell, "Effects of Counterions on Surfactant Surface Aggregates at the Alumina/Aqueous Solution Interface", *Langmuir*, Volume 3, No. 4, American Chemical Society, 1987, pages 500–511. For purposes of the present invention, such estimates are taken as definitive. Admicelle patchiness may vary considerably, but usually it is in the range of from 0.1 to 100 area percent. Often it is in the range of from 1 to 75 area percent. From 2 to 50 area percent is preferred.

The solvent of the monomer solution is aqueous. Water may be used alone but in many instances a mixture of water and at least one organic polar cosolvent is used to increase the solubility of nonpolar monomer in the aqueous solvent. Examples of polar compounds that can be used as cosolvents include methanol, ethanol, propanol, isopropanol, n-butanol, isobutanol, sec-butanol, tert-butanol, ethylene glyclol, 2-methoxyethanol, 2-ethoxyethanol, acetone, methyl ethyl ketone, methyl acetate, and ethyl acetate. A single organic polar cosolvent or a mixture of organic polar cosolvents may be used. The preferred solvent of the surfactant solution is a mixture of water and ethanol. It is especially preferred that the aqueous solvent of the surfactant solution be the same as the aqueous solvent of the monomer solution. In many instances the surfactant solution and the monomer solution are the same solution.

Monomer may be introduced to the system after formation of the admicelles or it may be present during their formation. The admicelles may be viewed as a two-dimensional solvent in which monomer can be adsolublized. Nonpolar monomer is believed to be dissolved in the nonpolar region of the admicelle surfactant bilayer. It has been discovered that, surprisingly, there is a cooperative effect between the admicelles (and perhaps the nonpolar monomer, if present) with polar monomer such that polar monomer can be homopolymerized or copolymerized with nonpolar monomer in the region of the admicelles to form thin films of polymer in association with the particulate amorphous silica. Although it is desired not to be bound by any theory, it is believed that the admicelles are not statically adsorbed to the polar solid surface. Rather, it is believed that the adsorption is dynamic, such that the admicelles or parts of them are continuously being desorbed from and adsorbed by the polar solid surface in an equilibrium manner. It is further believed that this dynamic desorption-adsorption may expose polar solid surface and/or polar regions of the first surfactant layer so that polar monomer may be adsorbed to it. It may be the case that the polar monomer is adsorbed by the surfactant in polar regions of the second surfactant layer of the admicelle. Whatever the mechanism and irrespective of any theory, however, it has been found that the admicelles do function to concentrate monomer near the surface of the particulate amorphous silica.

The monomers that can be used are many and widely varied. They may be liquid or gaseous. In most instances they are ethylenically unsaturated. Often they are monomers commonly used in forming rubber compositions.

The aliphatic monomers useful for forming homopolymer may be nonpolar or polar. Examples of aliphatic nonpolar monomers that may be used for forming nonpolar homopolymers include 1,3-butadiene, isoprene, and tetrafluoroethylene. Examples of aliphatic polar monomers that may be used for forming polar homopolymers include methyl methacrylate, vinyl acetate, vinyl chloride, vinylidene chloride, acrylonitrile, vinyl fluoride, and vinylidene fluoride.

Examples of systems of comonomers of which at least one is polar and at least one is nonpolar include vinyl acetate and 1,3-butadiene, 4-methoxystyrene and 1,3-butadiene, 4-chlorostyrene and 1,3-butadiene, methyl methacrylate and 1,3-butadiene, acrylonitrile and 1,3-butadiene, vinyl acetate and isoprene, 4-methoxystyrene and isoprene, 4-chlorostyrene and isoprene, methyl methacrylate and isoprene, and acrylonitrile and isoprene.

Examples of systems of comonomers of which at least two are different nonpolar monomers include isoprene and 1,3-butadiene, styrene and 1,3-butadiene, and styrene and isoprene.

The amount of monomer in the solution can be widely varied. In most cases the the monomer constitutes from 0.01 to 10 weight percent of the solution. Often the monomer constitutes from 0.05 to 5 weight percent of the solution. From 0.1 to 1 weight percent is preferred.

Initiator is usually, but not necessarily introduced to the system to initiate polymerization of the monomer. Substantially any free radical initiator can be used. Examples of suitable initiators include 2,2'-azobisisobutyronitrile, 2,2'-azobis(methylbutanenitrile), benzoyl peroxide, tert-butyl hydroperoxide, methyl ethyl ketone peroxide, diisopropyl peroxydicarbonate, and sodium persulfate. When used, the initiator normally constitutes from 0.001 to 1 weight percent of the solution. Frequently the initiator constitutes from 0.005 to 0.5 weight percent of the solution. From 0.01 to 0.1 weight percent is preferred. Initiators can be activated thermally, photochemically, or chemically as for example by electron transfer, which is the basis for cold polymerization as is well known in the art.

Initiation of polymerization by exposure to ionizing radiation or actinic light is also within contemplation.

The surfactant, monomer, and, when used, initiator, can be introduced to the solution simultaneously or sequentially and in any order. In most cases it will be preferred to dissolve the surfactant, monomer, and initiator in aqueous solvent to form a single solution.

Although it is preferable for the surfactant concentration in the liquid phase to be below the CMC when the monomer is polymerized, it is also preferable that the surfactant concentration of the solution be above the CMC when the solution is brought into contact with the particulate amorphous silica. This procedure is especially preferred when nonpolar monomer is also a component of the solution. Once the solution is brought into contact with the particulate amorphous silica, admicelle formation removes surfactant from the liquid phase so that as equilibrium is approached the concentration of the surfactant in the liquid phase is below the CMC. Adsolubilization of the monomer similarly reduces the monomer concentration in the liquid phase or, if additional monomer is introduced to the system, allows further quantities of monomer to be dissolved.

The temperature during polymerization may be any temperature where the monomer or monomers are customarily polymerized. In most instances the temperature is in the range of from $-10°$ C. to $95°$ C. Preferably the temperature is in the range of from $0°$ C. to $70°$ C. When the temperature is above ambient temperature, the reaction may be commenced by thermal decomposition of the initiator. When the temperature is below ambient temperature, photochemical activation or a redox activator system such as for example, ferrous sulfate, tetrasodium salt of ethylenediamine, and sodium formaldehyde sulfoxylate may be used to begin initiation by tertiary-butyl hydroperoxide. The pressure during polymerization may be subatmospheric, ambient atmospheric, or superatmospheric, as desired. When only liquid monomer is used, the pressure has little effect on the reaction. When gaseous monomer is employed, superatmospheric pressure is preferred because this usually increases the solubility of the monomer in the solution.

Following polymerization of the monomer, the surface-modified particulate amorphous silica may be separated from the liquid and then dried. Optionally, the surface-modified particulate amorphous silica may be washed with water or other polar solvent prior to final drying. Such washing is beneficial because it removes at least some of the surfactant which would otherwise be present.

Reasonable quantitative estimates of the "patchiness" of polymer coverage may be ascertained by analysis of the surface-modified particulate amorphous silica for carbon according to the general principles of ASTM E 350-90. Carbon content may vary considerably, but usually it is in the range of from 0.1 to 20 weight percent. Often it is in the range of from 0.5 to 20 weight percent. In many cases it is in the range of from 0.3 to 5.5 weight percent. From 1 to 10 weight percent is preferred.

The surface-modified particulate amorphous silica of the present invention is particularly well suited for use as reinforcing pigment in rubber compositions. The rubber compositions may be cured or uncured, as desired.

Examples of rubbers which may be used in the rubber composition of the present invention include saturated rubbers such as butyl rubber (IIR), bromobutyl rubber (BIIR), chlorobutyl rubber (CIIR), hydrogenated nitrile rubber (HNBR), fluorocarbon rubber (FKM), chlorosulfonated polyethylene (CSM), and terpolymers of ethylene-propylene with a diene rubber (EPDM) and general purpose diene rubbers such as natural rubber (NR), cis-polyisoprene (IR), chloroprene (CR), nitrile rubber (NBR), and polybutadiene (BR) and its copolymers containing styrene (SBR). One rubber or a mixture of different rubbers may be used as desired. Rubber products such as tires, shoes, hoses, belts, and mounts, for example, can thus benefit by use of the amorphous precipitated silica particles of the invention.

The amount of rubber present in the rubber-containing compositions of the invention may vary widely. In most instances rubber constitutes from 25 to 75 percent by weight of the composition. Often rubber constitutes from 35 to 65 percent by weight of the composition. From 45 to 60 percent by weight is preferred.

The amount of surface-modified particulate amorphous precipitated silica present in the rubber-containing compositions of the invention may vary widely. In most instances the surface-modified particulate amorphous precipitated silica is present in the composition in an amount in the range of from 1 to 100 parts per hundred parts by weight of the rubber present in the composition. Often the surface-modified particulate amorphous precipitated silica is present in the composition in an amount in the range of from 5 to 75 parts per hundred parts by weight of the rubber present in the composition. From 5 to 50 parts per hundred parts by weight of the rubber present in the composition is preferred.

Other materials customarily present in rubber compositions may optionally be present in amounts suitable for their intended purpose.

Rubber compositions are normally cured with vulcanizing agents and accelerators. The curing conditions are conventional and are those customarily and ordinarily employed in the art.

The invention is further described in conjunction with the following examples which are to be considered illustrative rather than limiting, and in which all parts are parts by weight and all percentages are percentages by weight unless otherwise specified.

The physical properties of unmodified particulate amorphous precipitated silica and surface modified particulate amorphous precipitated silica referred to in the Examples are identified in Table 1 together with the methods used for their determination.

TABLE 1

| Property | Physical Test Methods Method |
|---|---|
| Single-Point BET Surface Area | ASTM D 3037-92 |
| DBP Oil Adsorption | ASTM D 2414-92 |
| Median Agglomerate Particle Size | Model TAII Coulter Counter[1] |
| Total Pore Surface Area | Autoscan Mercury Porosimetry[1] |
| Average Pore Diameter | Autoscan Mercury Porosimetry[1] |
| Percent Carbon | ASTM E 350-90 |

[1]In accordance with the operating manual and software accompanying the instrument.

Rubber composition physical properties referred to in the Examples are identified in Table 2 together with the methods used for their determination.

TABLE 2

| Property | Physical Test Methods Method |
|---|---|
| Cure Properties Maximum Torque $T_{90}$ Cure Time | ASTM D 2084-87. |
| Tensile Properties Tensile Strength Modulus Elongation at Break | ASTM D 412-87. |
| Molded Groove Tear | ASTM D 2262-87, modified by excluding use of the fabric backing on the rubber specimen. |
| Cut Growth | ASTM D 813-87. |
| Dynamic Properties Storage modulus, G' Loss modulus, G" | ASTM D 2231-87. | curable formulations was formed into mold specimens and cured for 10 minutes at 160° C. Upon cooling, samples of the cured formulations were tested for various physical properties. The results of physical testing of the samples are shown in Table 5.

TABLE 5

| | Particulate Silica | |
|---|---|---|
| Property | Control 1 | Control 2 |
| $T_{90}$ Cure Time, min | 4.4 | 2.3 |
| Maximum Torque, dNm | 23.0 | 15.2 |
| Break Strength, MPa | 20.6 | 17.0 |
| Elongation to Break, % | 657 | 600 |
| 20% Modulus, MPa | 0.63 | 0.55 |
| 100% Modulus, MPa | 1.41 | 1.30 |
| 300% Modulus, MPa | 3.85 | 3.60 |
| Tear Strength, N/mm | 11.5 | 7.0 |
| Cut Growth, mm @ 100 kc | 17.0 | 23.5 |
| G' @ 2% Strain, MPa | 3.66 | 1.43 |
| G" @ 2% Strain, MPa | 0.382 | 0.133 |

The results of physical testing shown in Table 5 indicate that when the principles of polystyrene surface modification of alumina in accordance with U.S. Pat. Nos. 4,770,906; 4,900,627; and 5,106,691 are applied to particulate amorphous silica, such application results in decreases in cure time and hysteresis (G") which are considered improvements to the cured rubber composition. However, tear strength decreases and cut growth increases which are considered detrimental to the cured rubber composition. On balance, Control 2 does not provide a satisfactory improvement to the cured rubber composition.

EXAMPLES 1–2

Total feed consisting of 1520 grams of Hi-Sil® 233 particulate amorphous precipitated silica, 95 grams of Macol® OP-10 SP surfactant (octylphenylethoxylate (10 EO)), 70 grams of isoprene, 10 grams of AIBN initiator, 500 milliliters of ethanol, and deionized water to form 19.5 liters were equilibrated at 30° C. for one hour, heated at 70° C. for five hours, and allowed to settle overnight. The supernatant was decanted and the residue was washed in water. The liquid above the solid substrate was pumped off, and tile solids were dried for 24 hours at a temperature greater than 105° C. The resulting product, which was particulate amorphous precipitated silica surface-modified with polyisoprene, was identified as Example 1.

In a reaction similar to that used to prepare the modified particulate amorphous precipitated silica of Example 1, 100 grams of CTAB surfactant was used rather than the Macol® OP-10 SP surfactant. The resulting product, which was particulate amorphous precipitated silica surface-modified with polyisoprene, was identified as Example 2.

The polyisoprene surface-modified particulate amorphous precipitated silicas of Examples 1 and 2 were tested for various physical properties. The results are shown in Table 6.

TABLE 6

| Physical Properties of Silica Surface-Modified with Polyisoprene | | |
|---|---|---|
| Property | Example 1 | Example 2 |
| Single Point $N_2$ BET Surface Area, m²/g | 116 | 101 |
| Median Agglomerate Particle Size, μm | 16.8 | 12.8 |
| Total Pore Surface Area, m²/g | 156 | 153 |
| Average Pore | 37.1 | 36.0 |

---

11

TABLE 2-continued

| | Physical Test Methods |
|---|---|
| Property | Method |
| (viz., hysteresis) | |

The rubber composition formulation used for all physical testing is shown is Table 3. The notation "phr" is an abbreviation for parts per hundred parts by weight of total rubber.

TABLE 3

| Rubber Formula | |
|---|---|
| Ingredient | Amount, phr |
| Natural Rubber | 70 |
| Styrene-Butadiene Rubber | 30 |
| Precipitated Silica | 45 |
| Naphthenic Oil | 17.5 |
| Butylated Bisphenol | 0.75 |
| Stearic Acid | 1.5 |
| Zinc Oxide | 4 |
| Sulfur | 2 |
| Benzothiazyl Disulfide | 2.5 |
| Diphenyl Guanidine | 0.8 |

COMPARATIVE CONTROLS

Untreated Hi-Sil® 233 particulate amorphous precipitated silica (nitrogen BET surface area of 141 m²g, dibutylphthalate oil adsorption of 200 mL/100g of silica) was identified as Control 1.

One thousand milliliters of total feed consisting of 20 grams of Hi-Sil® 233 particulate amorphous precipitated silica, 0.0055 molar 99% cetyltrimethylammonium bromide (CTAB), 0.0045 molar styrene, 0.003 molar azobisisobutyronitrile (AIBN) initiator, 0.7 molar ethanol which was required to solubilize the styrene and AIBN, and deionized water were equilibrated at 30° C., heated to 65° C. for a time period of 4.25 hours, and then allowed to settle overnight. The supernatant was decanted and the residue was washed in water. The liquid above the solid was pumped off and the solids were dried for 24 hours at a temperature greater than 60° C. The resulting product, which was particulate amorphous precipitated silica surface-modified with polystyrene, was identified as Control 2.

The particulate amorphous precipitated silicas were tested for various physical properties. The results are shown in Table 4.

TABLE 4

| Physical Properties of Unmodified Silica and Silica Surface-Modified with Polystyrene | | |
|---|---|---|
| Property | Control 1 | Control 2 |
| Single Point $N_2$ BET Surface Area, m²/g | 141 | 124 |
| Median Agglomerate Particle Size, μm | 15.1 | 16.8 |
| Total Pore Surface Area, m²/g | 166 | 155 |
| Average Pore Diameter, nm | 31.6 | 33.4 |
| Percent Carbon | — | 3.6 |

Curable rubber compositions were made using the untreated particulate amorphous precipitated silica of Control 1 and the particulate amorphous precipitated silica surface-treated with polystyrene of Control 2, respectively. In so doing, the ingredients in Table 3 were admixed according to ASTM D 3182-87 in the order and in the amounts therein specified. Each of the

TABLE 6-continued

Physical Properties of Silica Surface-Modified with Polyisoprene

| Property | Example 1 | Example 2 |
|---|---|---|
| Diameter, nm | | |
| Percent Carbon | 2.9 | 4.8 |

The data of Tables 4 and 6 show that the modification of particulate amorphous silica by polymerizing isoprene onto the surface reduced nitrogen BET surface area. The data further show that selection of the surfactant, nonionic or cationic, can be an important process variable.

Curable rubber compositions were made using the polyisoprene surface-modified particulate amorphous precipitated silicas of Example 1, and Example 2, respectively. In so doing, the ingredients in Table 3 were admixed according to ASTM D 3182-87 in the order and in the amounts therein specified. Each of the curable formulations was formed into mold specimens and cured for 10 minutes at 160° C. Upon cooling, samples of the cured formulations were tested for various physical properties. The results of physical testing of the samples are shown in Table 7.

TABLE 7

Rubber Composition Physical Properties

| | Particulate Silica | |
|---|---|---|
| Property | Example 1 | Example 2 |
| $T_{90}$ Cure Time, min | 3.9 | 3.0 |
| Maximum Torque, dNm | 17.0 | 19.1 |
| Break Strength, MPa | 20.5 | 21.2 |
| Elongation to Break, % | 601 | 619 |
| 20% Modulus, MPa | 0.60 | 0.65 |
| 100% Modulus, MPa | 1.55 | 1.56 |
| 300% Modulus, MPa | 4.00 | 4.07 |
| Tear Strength, N/mm | 10.5 | 12.0 |
| Cut Growth, mm @ 100 kc | 16.0 | 15.3 |
| G' @ 2% Strain, MPa | 1.40 | 1.64 |
| G" @ 2% Strain, MPa | 0.122 | 0.157 |

The results of Tables 5 and 7 show that modification of particulate amorphous silica by polymerizing isoprene onto the surface decreases cure time, hysteresis, and cut growth and maintains tear strength compared to Control 1. Examples 1 and 2 also show decreases in cut growth and increases in tear strength compared to Control 2.

EXAMPLES 3-5

One thousand milliliters of total feed consisting of 20 grams of Hi-Sil® 233 particulate amorphous precipitated silica, 0.002 molar Triton X-100 surfactant (octylphenol ethoxylated with 9 to 10 moles of ethylene oxide), 1 gram of butadiene, 0.4 gram of tetrasodium salt of ethylenediamine tetraacetic acid, 0.15 gram of sodium formaldehyde sulfoxylate, 0.25 gram of 70% tertiary-butyl hydroperoxide, and deionized water was stirred for one hour at room temperature. One gram of butadiene and 0.2 gram of ferrous sulfate were added and stirring was continued for two hours. Ethanol and methoxychlor were added to quench the reaction and the mixture was allowed to settle overnight. The supernatant was decanted, the residue was washed in water, and the liquid above the solid substrate was pumped off. The solids were dried for 24 hours at a temperature greater than 105° C. The resulting product, which was particulate amorphous precipitated silica surface-modified with polybutadiene, was identified as Example 3.

In similar reactions, the reaction was quenched after four and six hours, respectively. The resulting products, which were particulate amorphous precipitated silicas surface-modified with polybutadiene, were identified as Examples 4 and 5, respectively.

The polybutadiene surface-modified particulate amorphous precipitated silicas of Examples 3, & and 5 were tested for various physical properties. The results are shown in Table 8.

TABLE 8

Physical Properties of Silica Surface-Modified with Polybutadiene

| Property | Example 3 | Example 4 | Example 5 |
|---|---|---|---|
| Single Point $N_2$ BET Surface Area, m²/g | 128 | 122 | 130 |
| Median Agglomerate Particle Size, μm | 18.2 | 19.0 | 16.9 |
| Total Pore Surface Area, m²/g | 162 | 149 | 156 |
| Average Pore Diameter, nm | 36.2 | 36.8 | 35.8 |
| Percent Carbon | 0.9 | 1.2 | 1.6 |

The data in Tables 4 and 8 show that the modification of particulate amorphous silica by polymerizing butadiene onto the surface reduced nitrogen BET surface area. The data further show that reaction time can be an important process variable.

Curable rubber compositions were made using the polybutadiene surface-modified particulate amorphous precipitated silicas of Examples 3, 4, and 5, respectively. In so doing, the ingredients in Table 3 were admixed according to ASTM D 3182-87 in the order and in the amounts therein specified. Each of the curable formulations was formed into mold specimens and cured for 10 minutes at 160° C. Upon cooling, samples of the cured formulations were tested for various physical properties. The results of physical testing of the samples are shown in Table 9.

TABLE 9

Rubber Composition Physical Properties

| | Particulate Silica | | |
|---|---|---|---|
| Property | Example 3 | Example 4 | Example 5 |
| $T_{90}$ Cure Time, min | 2.1 | 1.7 | 2.0 |
| Maximum Torque, dNm | 20.7 | 20.9 | 22.1 |
| Break Strength, MPa | 20.1 | 21.0 | 21.9 |
| Elongation to Break, % | 653 | 671 | 622 |
| 20% Modulus, MPa | 0.61 | 0.65 | 0.67 |
| 100% Modulus, MPa | 1.50 | 1.49 | 1.48 |
| 300% Modulus, MPa | 3.77 | 4.11 | 3.95 |
| Tear Strength, N/mm | 16.3 | 16.9 | 19.1 |
| Cut Growth, mm @ 100 kc | 17.6 | 16.0 | 15.1 |
| G' @ 2% Strain, MPa | 3.11 | 3.19 | 3.16 |
| G" @ 2% Strain, MPa | 0.303 | 0.311 | 0.327 |

Results of physical testing show that modification of particulate amorphous silica by polymerizing butadiene onto the surface decreases composition cure time and hysteresis compared to Control 1 and increases tear strength and decreases cut growth compared to Control 2.

EXAMPLES 6-7

One thousand milliliters of total feed consisting of 20 grams of Hi-Sil® 233 particulate amorphous precipitated silica, 0.0042 molar Triton X-100 surfactant, 0.25 gram of styrene, 0.515 gram of 70% tertiary-butyl hydroperoxide, 0.202 gram of 1-dodecanethiol, 0.4942 gram of tetrasodium salt of ethylenediamine tetraacetic acid, 0.2 gram of sodium formaldehyde sulfoxylate, and deionized water was stirred for one hour at room temperature. Eight-tenths of a gram of butadiene and 0.1112 gram of ferrous sulfate were added and stirring was continued for 24 hours at 0° C. Ethanol and methoxychlor were added to quench the reaction and the mixture was allowed to settle overnight. The supernatant was decanted, the residue was washed in water, and the liquid above the solid substrate was pumped off. The solids were dried for 24 hours at a temperature greater than 105° C. The resulting product, which was particulate amorphous precipitated silica surface-modified with a styrene-butadiene copolymer, was identified as Example 6.

In a similar reaction, 0.008 molar sodium dodecyl sulfate (SDS) was used as the sole surfactant and 0.76 gram of tetrasodium salt of ethylenediamine tetraacetic acid, 0.308 gram of sodium formaldehyde sulfoxylate, and 0.579 gram of 70% tertiary-butyl hydroperoxide were employed. The resulting product, which was particulate amorphous precipitated silica surface-modified with a styrene-butadiene copolymer, was identified as Example 7.

The poly(styrene-butadiene) surface-modified particulate amorphous precipitated silicas of Example 6 and Example 7 were tested for various physical properties. The results are shown in Table 10.

TABLE 10

Physical Properties of Silica Surface-Modified with Poly(Styrene-Butadiene)

| Property | Example 6 | Example 7 |
|---|---|---|
| Single Point $N_2$ BET Surface Area, $m^2/g$ | 108 | 140 |
| Median Agglomerate Particle Size, $\mu m$ | 18.5 | 17.8 |
| Total Pore Surface Area, $m^2/g$ | 146 | 169 |
| Average Pore Diameter, nm | 36.5 | 35.0 |
| Percent Carbon | 3.9 | 0.3 |

The data of Tables 4 and 10 show that the modification of particulate amorphous silica by copolymerizing styrene and butadiene onto the surface reduced the nitrogen BET surface area. Data further show that selection of the surfactant can be an important process variable.

Curable rubber compositions were made using the poly(styrene-butadiene) surface-modified particulate amorphous precipitated silicas of Examples 6 and 7, respectively. In so doing, the ingredients in Table 3 were admixed according to ASTM D 3182-87 in the order and in the amounts therein specified. Each of the curable formulations was formed into mold specimens and cured for 10 minutes at 160° C. Upon cooling, samples of the cured formulations were tested for various physical properties. The results of physical testing of the samples are shown in Table 11.

TABLE 11

Rubber Composition Physical Properties

| Property | Particulate Silica | |
|---|---|---|
| | Example 6 | Example 7 |
| $T_{90}$ Cure Time, min | 2.1 | 3.2 |
| Maximum Torque, dNm | 23.4 | 19.7 |
| Break Strength, MPa | 21.4 | 20.2 |
| Elongation to Break, % | 723 | 641 |
| 20% Modulus, MPa | 0.64 | 0.55 |
| 100% Modulus, MPa | 1.39 | 1.22 |

TABLE 11-continued

Rubber Composition Physical Properties

| Property | Particulate Silica | |
|---|---|---|
| | Example 6 | Example 7 |
| 300% Modulus, MPa | 4.17 | 3.41 |
| Tear Strength, N/mm | 15.4 | 10.9 |
| Cut Growth, mm @ 100 kc | 10.3 | 14.8 |
| G' @ 2% Strain, MPa | 3.14 | 2.85 |
| G" @ 2% Strain, MPa | 0.344 | 0.256 |

Results of physical testing show that modification of particulate amorphous silica by copolymerizing styrene and butadiene onto the surface decreases composition cure time and hysteresis compared to Control 1 and increases tear strength and reduces cut growth compared to Control 2.

EXAMPLES 8-9

Total feed consisting of 1520 grams of Hi-Sil® 233 particulate amorphous precipitated silica, 100 grams of CTAB surfactant, 60 grams of isoprene, 15 grams of styrene, 10 grams of AIBN initiator, 500 milliliters of ethanol, and deionized water to form 19.5 liters were equilibrated at 30° C. for one hour, heated at 70° C. for five hours, and allowed to settle overnight. The supernatant was decanted and the residue was washed in water. The liquid above the solid substrate was pumped off, and the solids were dried for 24 hours at a temperature greater than 105° C. The resulting product, which was particulate amorphous precipitated silica surface-modified with a styrene-isoprene copolymer, was identified as Example 8.

In a similar reaction, 95 grams of Macol® OP-10 SP surfactant was used as the sole surfactant and 17.75 grams of AIBN initiator was employed. The resulting product, which was particulate amorphous precipitated silica surface-modified with a styrene-isoprene copolymer, was identified as Example 9.

The poly(styrene-isoprene) surface-modified particulate amorphous precipitated silicas of Example 8 and Example 9 were tested for various physical properties. The results are shown in Table 12.

TABLE 12

Physical Properties of Silica Surface-Modified with Poly(Styrene-Isoprene)

| Property | Example 8 | Example 9 |
|---|---|---|
| Single Point $N_2$ BET Surface Area, $m^2/g$ | 94 | 116 |
| Median Agglomerate Particle Size, $\mu m$ | 14.7 | 15.9 |
| Total Pore Surface Area, $m^2/g$ | 143 | 156 |
| Average Pore Diameter, nm | 35.9 | 34.6 |
| Percent Carbon | 5.5 | 3.4 |

The data of Tables 4 and 12 show that the modification of particulate amorphous silica by copolymerizing styrene and isoprene onto the surface reduced the nitrogen BET surface area. The data further show that selection of the surfactant can be an important process variable.

Curable rubber compositions were made using the poly(styrene-isoprene) surface-modified particulate amorphous precipitated silicas of Examples 8 and 9, respectively. In so doing, the ingredients in Table 3 were admixed according to ASTM D 3182-87 in the order and in the amounts therein specified. Each of the curable formulations was formed into mold specimens and cured for 10 minutes at 160° C. Upon cooling, samples of the cured formulations were tested for various physical properties. The results of physical testing of the samples are shown in Table 13.

TABLE 13

Rubber Composition Physical Properties

| Property | Particulate Silica | |
|---|---|---|
| | Example 8 | Example 9 |
| $T_{90}$ Cure Time, min | 2.8 | 3.2 |
| Maximum Torque, dNm | 24.2 | 23.6 |
| Break Strength, MPa | 22.1 | 21.5 |
| Elongation to Break, % | 633 | 629 |
| 20% Modulus, MPa | 0.60 | 0.58 |
| 100% Modulus, MPa | 1.51 | 1.46 |
| 300% Modulus, MPa | 4.91 | 4.43 |
| Tear Strength, N/mm | 15.8 | 14.1 |
| Cut Growth, mm @ 100 kc | 18.1 | 22.5 |
| G' @ 2% Strain, MPa | 3.50 | 3.41 |
| G" @ 2% Strain, MPa | 0.370 | 0.335 |

Results of physical testing show that modification of particulate amorphous silica by polymerizing styrene and isoprene onto the surface decreases composition cure time and hysteresis compared to Control 1 and increases tear strength and reduces cut growth compared to Control 2.

EXAMPLE 10

Total feed consisting of 1520 grams of Hi-Sil® 233 particulate amorphous precipitated silica, 19.9 grams of Macol® OP-10 SP surfactant, 4 grams of vinyl acetate, 4 grams of 70% tert-butyl hydroperoxide, 5.6 grams of tetrasodium salt of ethylenediamine tetraacetic acid, 2.4 grams of sodium formaldehyde sulfoxylate, and deionized water to form 4 liters were stirred at room temperature for one hour. Eight grams of butadiene and 0.04 gram of ferrous sulfate were added and stirring was continued for 12 hours at 5° C. Ethanol and methoxychlor were added to quench the reaction and the mixture was allowed to settle overnight. The supernatant was decanted and the residue was washed in water. The liquid above the solid substrate was pumped off, and the solids were dried for 24 hours at a temperature greater than 105° C. The resulting product, which was particulate amorphous precipitated silica surface-modified with an vinyl acetate-butadiene copolymer, was identified as Example 10.

The poly(vinyl acetate-butadiene) surface-modified particulate amorphous precipitated silica of Example 10 was tested for various physical properties. The results are shown in Table 14.

TABLE 14

Physical Properties of Silica Surface-Modified with Poly(Vinyl Acetate-Butadiene)

| Property | Example 10 |
|---|---|
| Single Point $N_2$ BET Surface Area, m²/g | 130 |
| Median Agglomerate Particle Size, μm | 18.2 |
| Total Pore Surface Area, m²/g | 163 |
| Average Pore Diameter, nm | 31.5 |
| Percent Carbon | <1.0 |

The data of Tables 4 and 14 show that the modification of particulate amorphous silica by copolymerizing vinyl acetate and butadiene onto the surface reduced the nitrogen BET surface area. The data further show that selection of comonomers can be an important process variable.

A curable rubber composition was made using the poly(vinyl acetate-butadiene) surface-modified particulate amorphous precipitated silica of Example 10. In so doing, the ingredients in Table 3 were admixed according to ASTM D 3182-87 in the order and in the amounts therein specified. The curable formulation was formed into mold specimens and cured for 10 minutes at 160° C. Upon cooling, samples of the cured formulation were tested for various physical properties. The results of physical testing of the samples are shown in Table 15.

TABLE 15

Rubber Composition Physical Properties

| Property | Particulate Silica Example 10 |
|---|---|
| $T_{90}$ Cure Time, min | 4.0 |
| Maximum Torque, dNm | 27.7 |
| Break Strength, MPa | 21.6 |
| Elongation to Break, % | 689 |
| 20% Modulus, MPa | 0.72 |
| 100% Modulus, MPa | 1.38 |
| 300% Modulus, MPa | 3.47 |
| Tear Strength, N/mm | 15.2 |
| Cut Growth, mm @ 100 kc | 13.1 |
| G' @ 2% Strain, MPa | 3.27 |
| G" @ 2% Strain, MPa | 0.278 |

The results of physical testing show that modification of particulate amorphous silica by copolymerizing vinyl acetate and butadiene onto the surface decreases composition cure time and hysteresis compared to Control 1 and increases tear strength and decreases cut growth compared to Control 2.

EXAMPLE 11

The procedure of Example 10 was repeated except that grams of 4-methoxystyrene was used instead of 4 grams of vinyl acetate. The resulting product, which was particulate amorphous precipitated silica surface-modified with an 4-methoxystyrene-butadiene copolymer, was identified as Example 11.

The poly(4-methoxystyrene-butadiene) surface-modified particulate amorphous precipitated silica of Example 11 was tested for various physical properties. The results are shown in Table 16.

TABLE 16

Physical Properties of Silica Surface-Modified with Poly(4-Methoxystyrene-Butadiene)

| Property | Example 11 |
|---|---|
| Single Point $N_2$ BET Surface Area, m²/g | 117 |
| Median Agglomerate Particle Size, μm | 18.9 |
| Total Pore Surface Area, m²/g | 159 |
| Average Pore Diameter, nm | 31.6 |
| Percent Carbon | 2.3 |

The data of Tables 4 and 16 show that the modification of particulate amorphous silica by copolymerizing 4-methoxystyrene and butadiene onto the surface reduced the nitrogen BET surface area.

A curable rubber composition was made using the poly(4-methoxystyrene-butadiene) surface-modified particulate amorphous precipitated silica of Example 11. In so doing, the ingredients in Table 3 were admixed according to ASTM D 3182-87 in the order and in the amounts therein specified. The curable formulation was formed into mold specimens and cured for 10 minutes at 160° C. Upon cooling, samples of the cured formulation were tested for various physical properties. The results of physical testing of the samples are shown in Table 17.

TABLE 17

Rubber Composition Physical Properties

| Property | Particulate Silica Example 11 |
|---|---|
| $T_{90}$ Cure Time, min | 3.8 |
| Maximum Torque, dNm | 27.0 |
| Break Strength, MPa | 21.9 |
| Elongation to Break, % | 671 |
| 20% Modulus, MPa | 0.70 |
| 100% Modulus, MPa | 1.43 |
| 300% Modulus, MPa | 3.61 |
| Tear Strength, N/mm | 17.1 |
| Cut Growth, mm @ 100 kc | 15.4 |
| G' @ 2% Strain, MPa | 3.66 |
| G" @ 2% Strain, MPa | 0.289 |

The results of physical testing show that modification of particulate amorphous silica by copolymerizing 4-methoxystyrene and butadiene onto the surface decreases composition cure time and hysteresis compared to Control 1 and increases tear strength and decreases cut growth compared to Control 2.

EXAMPLE 12

The procedure of Example 10 was repeated except that grams of 4-chlorostyrene was used instead of 4 grams of vinyl acetate. The resulting product, which was particulate amorphous precipitated silica surface-modified with a 4-chlorostyrene-butadiene copolymer, was identified as Example 12.

The poly(4-chlorostyrene-butadiene) surface-modified particulate amorphous precipitated silica of Example 12 was tested for various physical properties. The results are shown in Table 18.

TABLE 18

Physical Properties of Silica Surface-Modified with Poly(4-Chlorostyrene-Butadiene)

| Property | Example 12 |
|---|---|
| Single Point $N_2$ BET Surface Area, $m^2/g$ | 110 |
| Median Agglomerate Particle Size, $\mu m$ | 18.1 |
| Total Pore Surface Area, $m^2/g$ | 151 |
| Average Pore Diameter, nm | 33.7 |
| Percent Carbon | 3.1 |

The data of Tables 4 and 18 show that the modification of particulate amorphous silica by copolymerizing 4-chlorostyrene and butadiene onto the surface reduced the nitrogen BET surface area.

A curable rubber composition was made using the poly(4-chlorostyrene-butadiene) surface-modified particulate amorphous precipitated silica of Example 12. In so doing, the ingredients in Table 3 were admixed according to ASTM D 3182-87 in the order and in the amounts therein specified. The curable formulation was formed into mold specimens and cured for 10 minutes at 160° C. Upon cooling, samples of the cured formulation were tested for various physical properties. The results of physical testing of the samples are shown in Table 19.

TABLE 19

Rubber Composition Physical Properties

| Property | Particulate Silica Example 12 |
|---|---|
| $T_{90}$ Cure Time, min | 3.2 |
| Maximum Torque, dNm | 26.1 |
| Break Strength, MPa | 22.6 |
| Elongation to Break, % | 611 |
| 20% Modulus, MPa | 0.73 |
| 100% Modulus, MPa | 1.47 |
| 300% Modulus, MPa | 3.90 |
| Tear Strength, N/mm | 14.6 |
| Cut Growth, mm @ 100 kc | 17.6 |
| G' @ 2% Strain, MPa | 3.29 |
| G" @ 2% Strain, MPa | 0.253 |

The results of physical testing show that modification of particulate amorphous silica by copolymerizing 4-chlorostyrene and butadiene onto the surface decreases composition cure time and hysteresis compared to Control 1 and increases tear strength and decreases cut growth compared to Control 2.

EXAMPLE 13

The procedure of Example 10 was repeated except that 4 grams of methyl methacrylate was used instead of 4 grams of vinyl acetate. The resulting product, which was particulate amorphous precipitated silica surface-modified with a methyl methacrylatebutadiene copolymer, was identified as Example 13.

The poly(methyl methacrylate-butadiene) surface-modified particulate amorphous precipitated silica of Example 13 was tested for various physical properties. The results are shown in Table 20.

TABLE 20

Physical Properties of Silica Surface-Modified with Poly(Methyl Methacrylate-Butadiene)

| Property | Example 13 |
|---|---|
| Single Point $N_2$ BET Surface Area, $m^2/g$ | 116 |
| Median Agglomerate Particle Size, $\mu m$ | 21.7 |
| Total Pore Surface Area, $m^2/g$ | 162 |
| Average Pore Diameter, nm | 31.4 |
| Percent Carbon | 2.2 |

The data of Tables 4 and 20 show that the modification of particulate amorphous silica by copolymerizing methyl methacrylate and butadiene onto the surface reduced the nitrogen BET surface area.

A curable rubber composition was made using the poly(methyl methacrylate-butadiene) surface-modified particulate amorphous precipitated silica of Example 13. In so doing, the ingredients in Table 3 were admixed according to ASTM D 3182-87 in the order and in the amounts therein specified. The curable formulation was formed into mold specimens and cured for 10 minutes at 160° C. Upon cooling, samples of the cured formulation were tested for various physical properties. The results of physical testing of the samples are shown in Table 21.

TABLE 21

| Rubber Composition Physical Properties | |
|---|---|
| Property | Particulate Silica Example 12 |
| $T_{90}$ Cure Time, min | 3.1 |
| Maximum Torque, dNm | 26.8 |
| Break Strength, MPa | 22.3 |
| Elongation to Break, % | 653 |
| 20% Modulus, MPa | 0.74 |
| 100% Modulus, MPa | 1.44 |
| 300% Modulus, MPa | 3.77 |
| Tear Strength, N/mm | 15.9 |
| Cut Growth, mm @ 100 kc | 17.9 |
| G' @ 2% Strain, MPa | 3.83 |
| G" @ 2% Strain, MPa | 0.291 |

The results of physical testing show that modification of particulate amorphous silica by copolymerizing methyl methacrylate and butadiene onto the surface decreases composition cure time and hysteresis compared to Control 1 and increases tear strength and decreases cut growth compared to Control 2.

EXAMPLE 14

The procedure of Example 10 was repeated except that grams of acrylonitrile was used instead of 4 grams of vinyl acetate. The resulting product, which was particulate amorphous precipitated silica surface-modified with an acrylonitrile-butadiene copolymer, was identified as Example 14.

The poly(acrylonitrile-butadiene) surface-modified particulate amorphous precipitated silica of Example 14 was tested for various physical properties. The results are shown in Table 22.

TABLE 22

| Physical Properties of Silica Surface-Modified with Poly(Acrylonitrile-Butadiene) | |
|---|---|
| Property | Example 14 |
| Single Point $N_2$ BET Surface Area, $m^2/g$ | 118 |
| Median Agglomerate Particle Size, μm | 19.9 |
| Total Pore Surface Area, $m^2/g$ | 154 |
| Average Pore Diameter, nm | 32.4 |
| Percent Carbon | 1.7 |

The data of Tables 4 and 22 show that the modification of particulate amorphous silica by copolymerizing acrylonitrile and butadiene onto the surface reduced the nitrogen BET surface area.

A curable rubber composition was made using the poly(acrylonitrile-butadiene) surface-modified particulate amorphous precipitated silica of Example 14. In so doing, the ingredients in Table 3 were admixed according to ASTM D 3182-87 in the order and in the amounts therein specified. The curable formulation was formed into mold specimens and cured for 10 minutes at 160° C. Upon cooling, samples of the cured formulation were tested for various physical properties. The results of physical testing of the samples are shown in Table 23.

TABLE 23

| Rubber Composition Physical Properties | |
|---|---|
| Property | Particulate Silica Example 14 |
| $T_{90}$ Cure Time, min | 3.7 |
| Maximum Torque, dNm | 27.9 |
| Break Strength, MPa | 22.0 |
| Elongation to Break, % | 599 |
| 20% Modulus, MPa | 0.78 |
| 100% Modulus, MPa | 1.39 |
| 300% Modulus, MPa | 3.39 |
| Tear Strength, N/mm | 14.0 |
| Cut Growth, mm @ 100 kc | 12.8 |
| G' @ 2% Strain, MPa | 3.56 |
| G" @ 2% Strain, MPa | 0.280 |

The results of physical testing show that modification of particulate amorphous silica by copolymerizing acrylonitrile and butadiene onto the surface decreases composition cure time and hysteresis compared to Control 1 and increases tear strength and decreases cut growth compared to Control 2.

Although the present invention has been described with reference to specific details of certain embodiments thereof, it is not intended that such details should be regarded as limitations upon the scope of the invention except insofar as they are included in the accompanying claims.

We claim:

1. A process for producing surface-modified particulate amorphous silica, said process comprising: (a) bringing into mutual contact particulate amorphous silica, surfactant, monomer, and an aqueous solvent so that as equilibrium is approached the concentration of the surfactant in the liquid phase is below, at, or slightly above the critical micelle concentration; and (b) polymerizing the monomer to form polymeric film associated with a portion of the surface of the particulate amorphous silica, the polymeric film being (i) homopolymer of an aliphatic monomer or (ii) copolymer of at least two different monomers, wherein the surface-modified particulate amorphous silica so produced has a carbon content in the range of from 0.1 to 20 weight percent.

2. The process of claim 1 wherein as equilibrium is approached the concentration of the surfactant in the liquid phase is below the critical micelle concentration.

3. The process of claim 2 wherein the particulate amorphous silica is particulate amorphous precipitated silica.

4. The process of claim 3 wherein the surfactant is a nonionic surfactant.

5. The process of claim 4 wherein the nonionic surfactant is octylphenylethoxylate (10 EO).

6. The process of claim 3 wherein the surfactant is cationic surfactant.

7. The process of claim 6 wherein the cationic surfactant is cetyltrimethylammonium bromide.

8. The process of claim 3 wherein the monomer is ethylenically unsaturated.

9. The process of claim 3 wherein the monomer is selected from the group consisting of isoprene, 1,3-butadiene, a mixture of isoprene and 1,3-butadiene, a mixture of styrene and 1,3-butadiene, a mixture of vinyl acetate and 1,3-butadiene, a mixture of 4-methoxystyrene and 1,3-butadiene, a mixture of 4-chlorostyrene and 1,3-butadiene, a mixture of methyl methacrylate and 1,3-butadiene, a mixture of acrylonitrile and 1,3-butadiene, a mixture of styrene and isoprene, a mixture of vinyl acetate and isoprene, a mixture of 4-methoxystyrene and isoprene, a mixture of 4-chlorostyrene and isoprene, a mixture of methyl methacrylate and isoprene, and a mixture of acrylonitrile and isoprene.

10. In a method for producing surface-modified particles wherein:
(a) particulate substrate surface is contacted with surfactant solution comprising surfactant molecules dissolved in an aqueous solvent to form at least one admicelle on the substrate surface;
(b) the admicelle is contacted with monomer solution comprising monomer molecules dissolved in an aqueous solvent to concentrate at least a portion of the monomer molecules within the admicelle; and
(c) the concentrated monomer molecules are polymerized to produce polymeric film dimensionally determined by the admicelle and associated with a portion of the particulate substrate surface;
the improvement wherein the particulate substrate is particulate amorphous silica, the polymeric film is (i) homopolymer of an aliphatic monomer or (ii) copolymer of at least two different monomers, and the carbon content of the surface-modified particles is in the range of from 0.1 to 20 weight percent.

11. The method of claim 10 wherein the surfactant concentration in the liquid phase is below the critical micelle concentration when the monomer is polymerized.

12. The method of claim 11 wherein the surfactant concentration is above the critical micelle concentration when the surfactant solution is brought into contact with the particulate amorphous silica.

13. The method of claim 10 wherein the particulate amorphous silica is particulate amorphous precipitated silica.

14. The method of claim 13 wherein the surfactant is a nonionic surfactant.

15. The method of claim 14 wherein the nonionic surfactant is octylphenylethoxylate (10 EO).

16. The method of claim 13 wherein the surfactant is cationic surfactant.

17. The method of claim 16 wherein the cationic surfactant is cetyltrimethylammonium bromide.

18. The method of claim 13 wherein the monomer is ethylenically unsaturated.

19. The method of claim 13 wherein the monomer is selected from the group consisting of isoprene, 1,3-butadiene, a mixture of isoprene and 1,3-butadiene, a mixture of styrene and 1,3-butadiene, a mixture of vinyl acetate and 1,3-butadiene, a mixture of 4-methoxystyrene and 1,3-butadiene, a mixture of 4-chlorostyrene and 1,3-butadiene, a mixture of methyl methacrylate and 1,3-butadiene, a mixture of acrylonitrile and 1,3-butadiene, a mixture of styrene and isoprene, a mixture of vinyl acetate and isoprene, a mixture of 4-methoxystyrene and isoprene, a mixture of 4-chlorostyrene and isoprene, a mixture of methyl methacrylate and isoprene, and a mixture of acrylonitrile and isoprene.

20. The method of claim 13 wherein the pH of the surfactant solution is in the range of from 3 to 8.

21. The method of claim 10 wherein the surfactant solution and the monomer solution are separate solutions.

22. The method of claim 10 wherein the surfactant solution and the monomer solution are the same solution.

23. Surface-modified particles comprising particulate amorphous silica having a portion of the surface thereof associated with polymeric film of (i) homopolymer of an aliphatic monomer or (ii) copolymer of at least two different monomers, and having a carbon content in the range of from 0.1 to 20 weight percent.

24. The surface-modified particles of claim 23 wherein the particulate amorphous silica is particulate amorphous precipitated silica.

25. The surface-modified particles of claim 24 which have a carbon content in the range of from 0.5 to 20 weight percent.

26. The surface-modified particles of claim 24 wherein the polymeric film is (i) homopolymer selected from the group consisting of polyisoprene and polybutadiene, or (ii) copolymer selected from the group consisting of poly(isoprene-butadiene), poly(styrene-butadiene), poly(vinyl acetate-butadiene), poly(4-methoxystyrene-butadiene), poly(4-chlorostyrene-butadiene), poly(methyl methacrylate-butadiene), poly(acrylonitrile-butadiene), poly(styrene-isoprene), poly(vinyl acetate-isoprene), poly(4-methoxystyrene-isoprene), poly(4-chlorostyrene-isoprene), poly(methyl methacrylate-isoprene), poly(acrylonitrile-isoprene).

27. The surface-modified particles of claim 26 which have a carbon content in the range of from 0.5 to 20 weight percent.

28. The surface-modified particles of claim 26 which have a carbon content in the range of from 1 to 10 weight percent.

29. A rubber composition comprising rubber and the surface-modified particles of claim 23.

30. The rubber composition of claim 29 which is uncured.

31. The rubber composition of claim 29 which is cured.

32. The process of claim 1 wherein the surface-modified particulate amorphous silica so produced has a carbon content in the range of from 0.5 to 20 weight percent.

33. The process of claim 1 wherein the surface-modified particulate amorphous silica so produced has a carbon content in the range of from 1 to 10 weight percent, 34. The process of claim 1 wherein the surface-modified particulate amorphous silica so produced has a carbon content in the range of from 0.3 to 5.5 weight percent.

35. The method of claim 10 wherein the carbon content of the surface-modified particles is in the range of from 0.5 to 20 weight percent.

36. The method of claim 10 wherein the carbon content of the surface-modified particles is in the range of from 1 to 10 weight percent.

37. The method of claim 10 wherein the carbon content of the surface-modified particles is in the range of from 0.3 to 5.5 weight percent.

38. The surface-modified particles of claim 24 which have a carbon content in the range of from 1 to 10 weight percent.

39. The surface-modified particles of claim 24 which have a carbon content in the range of from 0.3 to 5.5 weight percent.

40. The surface-modified particles of claim 26 which have a carbon content in the range of from 0.3 to 5.5 weight percent.

* * * * *